United States Patent Office 3,071,472
Patented Jan. 1, 1963

3,071,472
CAKE MIXES AND METHOD OF
PREPARING THE SAME
Richard E. Hager, Cincinnati, and Erlend R. Lowrey, Greenhills, Ohio, assignors to The Procter & Gamble Company, Cincinnati, Ohio, a corporation of Ohio
No Drawing. Filed Jan. 15, 1962, Ser. No. 166,390
11 Claims. (Cl. 99—94)

This invention relates to the art of prepared pulverulent culinary mixes of the type containing sugar, flour, and shortening as major ingredients and is concerned more particularly with the preparation of mixes of this type which may be made with a minimum of difficulty and time by a housewife relatively unskilled in baking into culinary products such as cakes, of improved characteristics both as to eating quality and physical appearance. Simplification of the manufacture of these mixes is also a goal of the invention.

It was proposed by Elsesser in U.S.P. 2,996,384 that a small amount, i.e., 0.1–1.0% by weight, of a water-soluble salt of carboxymethyl cellulose, otherwise known as cellulose glycollic acid, be added to prepared cake mixes such as are now widely sold throughout the country. According to the patentee, the incorporation of this additive in the mix contributed to easy preparation of the cake batter, especially if the housewife followed the so-called "single stage" method, wherein all of the ingredients, including eggs and the necessary amount of aqueous liquid, are simultaneously blended together, in contrast to known multi-stage techniques wherein selected major ingredients are creamed together in advance of the mixing of all constituents. Additional improvements alleged by the patentee were a permissible reduction in the amount of emulsified shortening without detriment to the crumb texture and moisture level of the resulting cakes, and better quality and volume in cakes embodying a combination of the low shortening content and single stage mixing.

While experience with the incorporation of carboxymethyl cellulose in cake mixes has so far failed to confirm that the particular advantages described by the patentee are obtained to any notable degree in actual practice, it has been found that the presence of carboxymethyl cellulose in cake mixes containing sugar, flour, and shortening is beneficial in promoting an increased moisture content in the products produced therefrom, without relation to reduced level of shortening and/or any special method of batter preparation, and more uniform retention of air in the batter during cooking, at least when introduced in the manner hereinafter set forth. Thus, for whatever the reason, the provision of carboxymethyl cellulose in prepared mixes of this type is a desideratum meriting attainment in the art.

As described by Elsesser, incorporation of the water-soluble salt of carboxymethyl cellulose into the non-shortening portion of the mix, i.e., the flour and sugar, prior to blending the shortening and non-shortening portions together was an important factor of his discovery, being, in fact, closely related to most effective utilization of the mixing force applied during batter preparation as well as to most effective hydration and dispersion of the dry ingredients by and in the aqueous liquid. Those skilled in the art are well aware that the non-shortening ingredients constitute from at least 75% to about 95% by weight of the mix whereas the shortening itself usually constitutes not more than about 15% thereof. On its face, this weight distribution suggests that a considerable economy would be achieved if it were possible to add the carboxymethyl cellulose to the shortening portion rather than the non-shortening portion of the mix. The weight of the material to be handled would, thus, be reduced substantially and mixers of much lower capacity necessitating a correspondingly lower capital investment could be employed. Also, the power requirements for operating this equipment would be drastically decreased, a hardly negligible consideration in terms of a production of several hundred or more tons of mix per day. One would be in a position, moreover, to utilize to fullest advantage the addition of the shortening to the dry ingredients in the form of a liquid or molten solid, which inherently results in more homogeneous distribution, by mixing the carboxymethyl cellulose in advance with the shortening while the latter is in flowable condition. Fluids can be effectively mixed by less costly equipment of the simple impeller type whereas heavier ribbon or paddle type mixers are needed for satisfactory admixture of pulverulent solids.

The practice of the Elsesser concept demands, in any event, a two-stage mixing operation: a first or preliminary stage wherein the carboxymethyl cellulose is distributed throughout the non-shortening ingredients and a second or main stage wherein the shortening is blended with the non-shortening ingredients. In each stage, the bulk of the ingredients of the mix must be handled and the time required for adequate mixing will consequently approach the maximum. A significant decrease in the mixing cycle could be achieved if only the shortening were involved in the preliminary stage. It will therefore be apparent that incorporation of the carboxymethyl cellulose with the shortening in flowable form, if possible, offers real economic benefits of a substantial order to the mix manufacturer.

Interestingly enough, it has been found that for mixes processed in the manner conventionally employed in the art Elsesser was essentially correct in his understanding that addition of the carboxymethyl cellulose to the non-shortening portion of the mix was an important factor in the successful practice of his invention, as addition of the carboxymethyl cellulose to the shortening in such mixes results in little, if any, improvement over the performance obtained if the additive is omitted entirely. However, it was discovered quite surprisingly that if the mix, during manufacture, is subjected to shearing and grinding forces as described and claimed in U.S.P. 2,874,051, -052, and -053, not only is it possible to employ the shortening as a carrier for the water-soluble salt of carboxymethyl cellulose without loss of the beneficial effect of this additive, but the resultant cakes are, in fact, superior in certain important respects to those prepared in accordance with the aforementioned Elsesser patent.

As explained in the three patents just identified, especially -053, the effect of applying shearing and crushing forces to the mix, for example, by passage through a roller mill in which adjacent rollers revolve at different speeds, is to fragment the sugar crystals and mechanically bond the fragments to flour particles with the shortening being coated as a thin film on the bonded sugar and flour particles. No logical explanation can be given why the presence of the carboxymethyl cellulose in the coating of shortening on the bonded particles should significantly promote the contribution of this additive above and beyond that obtained if an admixture of carboxymethyl cellulose and shortening is homogeneously distributed in other ways throughout the dry ingredients or if the carboxymethyl cellulose is combined with the non-shortening ingredients. Nevertheless, repeated experimentation has proved that this is the case. For example, to duplicate the cake volume obtained from a cake mix processed according to the invention with a mix that is otherwise identical except for the omission of treatment in a roller mill, 5% additional mix has consistently been required. Also, the non-roller milled mix has less tolerance for inadvertent departures by the housewife from the instructions for preparation. Such a result is all the more unexpected in view of the teachings of the -051 and -052 patents that cocoa in the case of chocolate-containing mixes and chemical leavening agents are preferably incorporated after the crushing and shearing operation if best results are to be obtained.

From what has been said, it will be seen that the method aspect of the present invention is characterized, in general, by the addition of a water-soluble salt of carboxymethyl cellulose in certain hereinafter specified amounts to at least the major dry ingredients of the mix, i.e., the sugar and flour, in the form of a uniform suspension or dispersion in the shortening thereof and, after a homogeneous admixture has been achieved, subjection of the same to a crushing and shearing operation, as by passage, for instance, through a differential speed roller mill. The resultant mix itself is characterized by a major part of the sugar crystals thereof being fragmented and mechanically bonded to the flour particles, the composite particles so obtained being coated with a thin film of the shortening in which a water-soluble salt of carboxymethyl cellulose is homogeneously dispersed. Cakes prepared from mixes so characterized exhibit excellent volume, proper relationship between heights measured at the center and at the periphery, more uniform retention of air as evidenced by fewer so-called holes and tunnels, and satisfactory structural cohesiveness.

As far as we are aware, the present invention is not critically related to any particular water-soluble salt of carboxymethyl cellulose and any of the salts of this material known to be suitable for use in association with food products may be employed. As a practical matter, the sodium salt is readily available and is in widespread use in foods generally; consequently, this salt is preferred. Similarly, the viscosity of the carboxymethyl cellulose may be selected from among the several types available in the art without materially affecting the results obtained by the practice of the invention. For example, we have employed a sodium salt of carboxymethyl cellulose rated at medium viscosity, i.e., a viscosity of 375–475 centipoises measured at a concentration of 2% in distilled water at 25° C. with a Brookfield LVF viscosimeter, using spindle #2 at 30 r.p.m., as well as the same salt rated at high viscosity, i.e., 1300–2200 centipoises measured at a concentration of 1% under the same conditions, with essentially equivalent results. It is possible, moreover, to compensate for viscosity differences of the carboxymethyl cellulose by adjusting the amount of the material employed. In general, we have no reason to believe that the viscosity range of 5–3,000 centipoises for a 1% solution of the water-soluble salt of carboxymethyl cellulose as established in the previously identified Elsesser patent is not equally applicable to the present concept, with the same intermediate range of 50–2200 centipoises, determined in the identical way, being preferred. The amount of carboxymethyl cellulose may vary for purposes of broadest usage within the range of 0.01–1.0% by dry weight of the total solids of the mix. It is preferred that the amount not exceed about 0.7% as higher amounts tend to impart a gummy or slimy impression in the mouth during mastication of the cakes prepared from such mixes, which impression is particularly evident at levels above 1.0%. At the lower end, 0.1% is preferred in order that the contribution of the carboxymethyl cellulose may be fully evident. Between 0.1 and 0.01%, the lowest level of the broad range specified above, the effect of the additive is correspondingly decreased, becoming virtually non-existent below this level. As employed by us, the carboxymethyl cellulose is in the form supplied by the manufacturer, namely, finely divided particles. It is not necessary that these particles be dissolved in water; in fact, this is distinctly disadvantageous to the satisfactory distribution of the carboxymethyl cellulose in the shortening and to the effect of the additive upon the ultimate product. The degree of fineness of these particles has not been found to be a significant factor, subject to the obvious limitation that it be consistent with the need for complete distribution throughout the shortening. The fact that the mix is ultimately subjected, in any event, to the crushing and shearing treatment whereby any large particles of carboxymethyl cellulose would probably be broken down into smaller particles likely provides an increased tolerance for somewhat larger particles than might otherwise be the case, but for best results, very large particles compared to the size of the sugar granules may well be avoided. Very good performance has been obtained, for example, with carboxymethyl cellulose described by the manufacturer as containing a maximum of 1% by weight retained on a 28-mesh Tyler screen and a maximum of 70% by weight passing a 200-mesh Tyler screen. A more specific analysis of the particle size distribution for this material is as follows:

| Mesh, Tyler screen: | Percent by weight retained |
|---|---|
| 28 | 0 |
| 35 | 1 |
| 65 | 28 |
| 100 | 9 |
| 150 | 7 |
| 200 | 10 |
| Remainder (through 200 mesh) | 44 |

Cake mixes embodying the concept of the invention may be formulated for any of a variety of types, such as yellow, devil's food, marble, spice, and so on.

Except for the addition of a water-soluble salt of carboxymethyl cellulose in the manner contemplated herein, the mixes of the invention are formulated in the same ways and with the same ingredients that are commonly employed in the art. This may be conveniently illustrated by the following general ranges for yellow type cakes and chocolate type cakes, respectively, all proportions being by weight.

Yellow type cake:

| Ingredient— | Percent |
|---|---|
| Sugar | 35–50 |
| Flour | 35–50 |
| Shortening | 9–15 |
| Non-fat dried milk solids | 0.5–5.0 |
| Salt | 0.5–2.0 |
| Leavening | 1.0–4.0 |
| Egg solids | 0–5.0 |
| Flavoring (including spices) | 0.1–5.0 |
| Coloring, minor amount, if any | |

Chocolate type cake:

| Ingredient— | |
|---|---|
| Sugar | 35–40 |
| Flour | 25–40 |
| Shortening | 9–15 |
| Non-fat dried milk solids | 0.5–3.0 |
| Leavening | 1.0–4.0 |
| Cocoa | 4.0–8.0 |
| Salt | 0.5–2.0 |
| Flavoring | 0.1–1.0 |
| Coloring, minor amount, if any | |

All of the ingredients listed above may be of conventional type and quality. Thus, the flour may be the usual bleached cake flour, although a good general purpose flour can be substituted, especially if appropriate emulsifiers are provided. The ordinary granulated sugars are quite satisfactory, including sucrose, dextrose, maltose, fructose, lactose, and brown and invert sugars, alone or in combination. The ratio of sugar to flour may be adjusted as necessary for special circumstances but a ratio of sugar to flour in excess of 1:1 has long been known to result in particularly good cake mixes.

As to the shortening, any of the ordinary animal or vegetable fats, which may have been partially hydrogenated before use, is suitable. Preferably, the shortening should be of the so-called emulsified variety, containing up to 50%, and more normally about 5–25%, by weight, of one or more suitable emulsifiers. The partially esterified polyhydric compounds having surface active properties are an exceptionally valuable example of appropriate emulsifiers. This class of emulsifiers includes, among others, mono- and di-glycerides of fatty acids, such as monostearin, monopalmitin, monolein, and dipalmitin; partial fatty acid esters of glycols, such as propylene glycol monostearate and monobehenate; higher fatty acid esters of sugars, such as the partial palmitic and oleic acid esters of sucrose; and phosphoric and sulfuric acid esters, such as dodecyl glyceryl ether sulfate and monostearin phosphate. Mention may also be made of the partial esters of hydroxy carboxylic acids, such as lactic, citric, and tartaric acids, with polyhydric compounds, for example, glyceryl lactopalmitate, and the polyoxyethylene ethers of fatty esters of polyhydric alcohols, such as a polyoxyethylene ether of sorbitan monostearate or distearate. Fatty acids alone or esterified with a hydroxy carboxylic acid, e.g., stearyl-2-lactylate, are also useful. The condition of the shortening may vary from distinctly liquid to very firm. We have found that slightly better results are achieved with normally solid shortening and, in this case, dissemination throughout the dry ingredients is facilitated by melting the shortening prior to mixing, as is explained more fully later. This is not to imply that liquid shortenings do not produce acceptable cakes or that solid shortenings may not be mixed except in liquid condition as any such implication would be erroneous.

The selection of a chemical leavening system from among those known in the art will pose no problem for one skilled in the formulation of culinary mixes. In general, such systems are composed of a baking soda, e.g., sodium, potassium, or ammonium bicarbonate, on the one hand, and one or more phosphate or other common baking acids on the other. Suitable baking acids include monocalcium phosphate, dicalcium phosphate, sodium acid pyrophosphate, potassium acid tartrate, monosodium phosphate, sodium aluminum phosphate, and sodium aluminum sulfate, among others. The amount of soda and the selected acid are so balanced as to achieve a pH in the resultant batter of about 6–10. Frequently, provision of a slight excess of soda is advantageous so as to assure absence of unreacted phosphate acid and/or to compensate for the acid tendencies of some batter ingredients.

For many mixes, it is accepted practice for the housewife to add the required amount of eggs in the course of batter preparation and this practice may be followed just as well in the present mixes. If desired, the inclusion of egg solids in the mix is an allowable alternative.

The function of, and permissible variations in, the remaining ingredients is sufficiently obvious to render a detailed explanation thereof unnecessary.

Once a suitable formulation has been established, consideration should be given to the mode of processing or compounding the ingredients thereof into the mix. For the purposes of this invention, the manner in which the carboxymethyl cellulose is incorporated into the shortening is of principal significance. It is known that uniform distribution of particulate material in solid or plastic shortening is possible and this technique may be employed here. Preferably, the shortening should be in fluid condition during the addition of the carboxymethyl cellulose. If the selected shortening is normally liquid, all that need be done is to blend in the carboxymethyl cellulose particles until a homogeneous dispersion has been achieved. The art generally recognizes, however, that some normally liquid shortenings may be inferior for use in cakes to normally solid shortenings. Consequently, under many circumstances, a shortening of a normally solid type may be employed to better advantage. In this case, the shortening should be melted for ease of mixing prior to incorporation therein of the carboxymethyl cellulose. The temperature to which the shortening is heated for melting may vary between approximately 120°–180° F., with 140°–150° F. being preferred. At temperatures above 180° F., flour tends to be degraded and shortening tends to undergo oxidation. For batch operation, the shortening may be melted in a container of suitable capacity provided with a simple impeller-mixer, after which the predetermined amount of carboxymethyl cellulose is added while the mixer is running. Once a uniform dispersion has been obtained, it is added to the dry ingredients before the carboxymethyl cellulose particles have an opportunity to settle. For continuous operation, the carboxymethyl cellulose particles may be metered in proper proportion into the shortening supply conduit upstream of an in-line, impeller-type mixer provided within the conduit at a point sufficiently close to discharge to preclude significant separation of the mixture. Where the term "fluid condition" or equivalent appears herein, it will be understood as embracing both normally liquid shortening and melted normally solid shortening but excluding shortening in gaseous condition.

In other respects, the steps of compounding the mix may be, and preferably are, the same as described in U.S.P. 2,874,051–2,874,053. The preferred sequence of mixing steps is as follows:

(1) The major ingredients, i.e., flour, sugar, and carboxymethyl cellulose-containing shortening, are blended into a homogeneous premix;
(2) The premix from step 1 is passed through an impact grinder to eliminate lumps or agglomerates;
(3) The de-lumped premix is subjected to the shearing and crushing treatment;
(4) The minor ingredients are uniformly incorporated; and
(5) The total mixture is subjected to impact grinding to eliminate lumps from final product.

For batch operation, steps 1 and 4 may be carried out in a ribbon mixer, the mixing time being within the range of 1 to 30 minutes. For continuous operation, a paddle-type mixer is preferred for a mixing time of from 1 to 30 minutes, dependent upon the particular type of mixer employed. Since the shortening, if not normally liquid, is preferably melted to promote better distribution of the carboxymethyl cellulose particles, the more efficient practice is to maintain the shortening in liquid condition until added to the dry ingredients. The addition of solid shortening to dry ingredients, however, is a known alternative and may be adopted, if desired.

The product from the mixing equipment mentioned above often includes lumps or agglomerates and, for this reason, each mixing step is advantageously followed by impact grinding. The impact grinder employed in step 2 is preferably a hammermill, whereas for the final step an impact grinder of the type known in the art under the name "Entoleter" is preferred. The latter device may be generically characterized as a "fling-type" grinder wherein the material to be ground is introduced into the center of a rapidly revolving circular array of pins enclosed within a fixed external shell. As the particles are hurled or flung outwardly by centrifugal force, they are intercepted and impacted by the whirling pins and, in rebounding from such impact, are impinged upon other pins or the external shell for further impacting, the action being repeated until the particles clear the pin array and pass out of the device. In addition to pulverizing lumps and the like, impact grinders obviously contribute to the over-all mixing action. If desired, the minor ingredients may be included in step 1 and, in this event, step 4 can be eliminated. Best results are obtained, however, when the minor ingredients are added subsequently to the shearing and crushing step. As employed herein, the term "minor ingredients" will be generally understood as embracing all of the ingredients in the formulation exclusive of the flour, sugar, and shortening. As the cocoa and leavening agents fall into this category, it will be seen that the preferred practice of the invention is consistent with the concept of the -051 and -052 patents mentioned above.

The most effective apparatus for applying crushing and shearing forces to the mix is a differential speed roller mill. The arrangement and operation of this mill are described in detail in the previously identified -053 patent to which reference should be made for a more complete understanding of this aspect of the invention. As is stated there, the roll speeds of adjacent rolls may have a ratio in the range of about 2:1 to about 5:1 or higher and for a multiple stack of rolls, the ratio of stages subsequent to the first may be reduced below about 2:1 to as low as about 1:1. The rolls may be heated or cooled, as is best for particular circumstances, provided degradation of any of the components of the mix is avoided. The clearance between the surfaces of adjacent roll pairs when the mix is passing through should be in the order of several thousandths of an inch, 7/1000 being a specific value found entirely satisfactory.

Mixes prepared in accordance with the present invention respond extremely well to the single-stage method of batter preparation already alluded to and are, in fact, specifically designed for preparation in this manner. There are no apparent reasons militating against the substitution of known multi-stage methods but since the latter are more complicated and time consuming and do not produce a correspondingly better result, their use is seldom justified. In the preferred single-stage method, all that is required is the addition of eggs, if egg solids are not already present in the mix, and aqueous liquids essential to the formation of a batter, followed by mixing to uniform batter consistency. For cakes of most types, two whole eggs or 96 grams of whole eggs, has been found to provide the proper amount of egg solids. Only 19 ounces of dry mix is needed to produce a cake of two layers and with this amount of mix, 1 to 1½ cups, i.e., 240 to 360 grams, of water will produce a satisfactory batter. With lesser or greater amounts of dry mix, the amount of water would be adjusted accordingly. Mixing may be accomplished either by hand or with a household electric mixer. For hand mixing a total of 300 strokes is recommended, while for machine mixing, for example, with a Sunbeam household-type mixer, two minutes at medium speed (450 r.p.m.) is entirely adequate. After mixing, equal parts of the batter are poured into two greased, 8-inch round pans and baked at 350° F. for 30–35 minutes until done.

A more complete understanding of the details of practicing the present invention and the improved results that it affords may be conveyed by the following specific examples which are given for purposes of illustration only. In each instance, the shortening was heated to a temperature of 140° F. until completely melted and, where employed, the sodium salt of carboxymethyl cellulose of the stated viscosity type, in the form of finely divided particles having a size distribution as previously described, was added to the molten shortening in the specified amount and mixed therewith by hand with a spatula for two minutes, at which point a uniform gross mix existed. The molten shortening, or carboxymethyl cellulose suspension in shortening, was blended into the sugar alone for two minutes, after which the flour was added and mixing continued for two additional minutes, using a Hobart paddle-type mixer. The resultant premix was passed once through a 4-high roller mill. The roll speed ratio for the adjacent rolls of this mill were 1:2.5 for first and second rolls, 1:2.2 for the second and third rolls, and 1:1.4 for the third and fourth rolls. The clearance between roll surfaces of all pairs was about 7/1000 inch while the mix was passing through. Before adition to the milled premix, the remaining, i.e., minor, ingredients were combined in a small Hobart paddle mixer, a mixing time of ten minutes being sufficient to give a uniform gross mix. The resultant premix of the minor ingredients was incorporated in the milled admixture of the major ingredients by means of a Hobart paddle mixer operated for eight minutes. Finally, the output from the last mixer was passed once through the Entoleter impact grinder operating at 4100 r.p.m.

Nineteen ounces of the dry mix so produced was made into batter according to the preferred procedure described above, using the specific conditions, given there.

For purposes of evaluation, the height was determined at the center and at the edge or periphery, while the layers were still hot, i.e., within 30 seconds of removal from the oven. A cut face of the layers was examined visually and graded as to grain characteristics and as to "holes and tunnels." In each case, the grading was between one and ten. A grade of one is extremely poor, whereas a grade of ten is excellent. A grade of at least seven is necessary for a commercially saleable mix. The term "holes and tunnels" refers to the voids or pockets that more often than not emerge in layer cakes during baking due to coalescence of a number of small air bubbles in the batter into large pockets. The grade for this characteristic is, therefore, an indication of the uniform air retention capabilities of the batter.

*Examples I and II*

Two typical yellow cakes were prepared according to the following basic formulation.

Basic formulation—Yellow cake:        Parts by weight
  Ingredients—
    Sugar, industrial fine _____ 43.5
    Cake flour _____ 40.5
    Emulsified shortening _____ 11.0
    Non-fat milk solids _____ 1.5
    Sodium bicarbonate _____ 0.9
    Monocalcium phosphate _____ 0.4
    Sodium acid pyrophosphate _____ 0.8
    Salt _____ 0.7
    Dextrose _____ 0.3
    Flavoring _____ 0.2 to one cake (Example I), there was added 0.20 part by weight of sodium carboxymetyhl cellulose salt, medium viscosity type, and in the other (Example II), the formulation was used unchanged. The following results were noted for the cake layers so produced:

EXPERIMENTAL RESULTS

| Example No. | Height (in.) | | Grain (grade) | Holes and Tunnels (grade) |
|---|---|---|---|---|
| | Center | Edge | | |
| I | 2.40 | 1.88 | 7.75 | 9.0 |
| II | 2.36 | 1.88 | 7.75 | 7.9 |

Both cakes were judged to have entirely satisfactory eating quality. The first, containing carboxymethyl cellulose, was characterized by greater moistness and slightly less tenderness than the second. A slight ring appeared on the crust of the second.

*Examples III and IV*

The above examples can be repeated with the basic formulation modified for a spice cake essentially by the addition of the requisite spices. Comparable improvement in the carboxymethyl cellulose-containing layers over the layers lacking this additive will be observed.

*Examples V and VI*

Two devil's food cakes were prepared from the following basic formulation.

Basis formulation—devil's food cake:

| Ingredients— | Parts by weight |
|---|---|
| Sugar, industrial fine | 35.0 |
| Cake flour | 33.5 |
| Emulsified shortening | 11.0 |
| Non-fat milk solids | 1.4 |
| Soduim bicarbonate | 1.8 |
| Monocalcium phosphate | 0.2 |
| Sodium acid pyrophosphate | 0.2 |
| Salt | 1.0 |
| Dextrose | 9.0 |
| Cocoa | 6.0 |
| Flavoring | 0.2 |

0.1% of sodium salt of carboxymethyl cellulose, high viscosity type, was added to one (Example V) and the other (Example VI) was used unchanged. The layers, after preparation and baking, were evaluated as before with the following results:

EXPERIMENTAL RESULTS

| Example No. | Height (in.) | | Grain (grade) | Holes and Tunnels (grade) |
|---|---|---|---|---|
| | Center | Edge | | |
| V | 2.38 | 1.84 | 7.75 | 9.0 |
| VI | 2.29 | 1.86 | 7.75 | 9.0 |

Again, both cakes were of acceptable eating quality with that of Example VI being more fragile and having a ring appearing on its crust.

*Examples VII and VIII*

Layers of a marble cake can be prepared as in the preceding examples by folding in equal parts of batters prepared from the formulation of Examples I and II and the formulation of Examples V and VI. Upon observation, the layers containing carboxymethyl cellulose will be of higher center height and rate higher as to holes and tunnels and moisture content than do the regular layers.

As can be seen from the experimental results summarized above, the cakes prepared from mixes including carboxymethyl cellulose according to the present invention exhibited improved height, especially at the center and rated very high as to holes and tunnels. It will also be noted that the improvement attributable to the presence of carboxymethyl cellulose was not at the expense of the grain of the cake or its eating characteristics, the latter, in fact, being superior in terms of increased moisture which is preferred by most consumers.

For practical reasons, the experimental work underlying the present invention was limited to carboxymethyl cellulose and the description and claims are correspondingly restricted. However, it is believed that other natural and synthetic hydrophilic colloids, such as locust bean gum, gum tragacanth, and the like, and carboxymethyl methyl cellulose, carboxymethyl hydroxyethyl cellulose, hydroxyethyl cellulose, and the like, would be expected to be more or less equivalent to carboxymethyl cellulose for purposes of increased moisture retention and uniform air retention in cake batters and could be substituted with generally corresponding results. Similarly, the concept of the invention can be applied to any pulverulent culinary mix other than cake mixes where increased moisture retention and uniform air retention would be valuable characteristics. Particles of mix can also be subsequently treated to form agglomerates.

Having thus described the invention, that which is claimed is:

1. A pulverulent and free-flowing cake mix comprising crystalline sugar, flour, and shortening in intimate admixture, a major part of the crystals of said sugar being fragmented and mechanically bonded to particles of said flour, said shortening being substantially homogeneously distributed throughout said mix in the form of a thin coating on the sugar and flour particles and containing in uniform admixture therewith about 0.01–1% by weight of said mix of a water-soluble salt of carboxymethyl cellulose.

2. A culinary mix as in claim 1 wherein said water-soluble salt of carboxymethyl cellulose is in the form of finely divided particles.

3. A culinary mix as in claim 2 wherein said carboxymethyl cellulose particles are of a size not greater than about 28 mesh, Tyler scale.

4. A culinary mix as in claim 1 wherein said water-soluble salt of carboxymethyl cellulose is present in the amount of at least about 0.1% by weight of the mix.

5. A culinary mix as in claim 1 wherein said water-soluble salt of carboxymethyl cellulose is the sodium salt.

6. In a method of preparing a pulverulent and free flowing culinary mix comprising crystalline sugar, flour, and shortening, the steps of uniformly admixing with said shortening about 0.01–1% by weight of the ingredients of said mix of a water-soluble salt of carboxymethyl cellulose, homogeneously blending the shortening containing said carboxymethyl cellulose salt with said sugar and flour, and thereafter subjecting the blend so obtained to simultaneous shearing and crushing forces to fragment a major part of sugar crystals and mechanically bond the same to particles of said flour, said shortening being distributed throughout said blend in the form of a thin coating on the sugar and flour particles, said carboxymethyl cellulose salt being retained in said coating.

7. The method of claim 6 wherein said carboxymethyl cellulose salt is in the form of finely divided particles.

8. The method of claim 6 wherein said blend is subjected to said forces by passage between at least two closely spaced rollers rotating at different speeds.

9. The method of claim 6 wherein said shortening containing said carboxymethyl cellulose salt is blended in fluid condition with said sugar and flour.

10. The method of claim 6 wherein said water-soluble salt of a carboxymethyl cellulose is the sodium salt.

11. The method of claim 6 wherein said shortening is in fluid condition while said carboxymethyl cellulose is admixed therewith.

References Cited in the file of this patent

UNITED STATES PATENTS

| 2,874,051 | Bedenk et al. | Feb. 17, 1959 |
| 2,874,052 | Bedenk | Feb. 17, 1959 |
| 2,874,053 | Mills | Feb. 17, 1959 |
| 2,996,384 | Elsesser | Aug. 15, 1961 |

UNITED STATES PATENT OFFICE
CERTIFICATE OF CORRECTION

Patent No. 3,071,472 January 1, 1963

Richard E. Hager et al.

It is hereby certified that error appears in the above numbered patent requiring correction and that the said Letters Patent should read as corrected below.

Column 1, line 21, for "0.1-" read -- 0.01- --; column 4, line 51, for "35-40" read -- 35-50 --; column 7, line 71, for "adition" read -- addition --; column 9, line 1, for "Basis" read -- Basic --.

Signed and sealed this 27th day of August 1963.

(SEAL)
Attest:

ERNEST W. SWIDER
Attesting Officer

DAVID L. LADD
Commissioner of Patents